US012229552B2

(12) United States Patent
Matthews et al.

(10) Patent No.: US 12,229,552 B2
(45) Date of Patent: Feb. 18, 2025

(54) GENERATING REVIEW LIKELIHOODS FOR SETS OF CODE

(71) Applicant: Adobe Inc., San Jose, CA (US)

(72) Inventors: Charles Robert John Matthews, Edinburgh (GB); Thomas Stanley Dalton, St Andrews (GB); Harinder Singh Sandhu, Edinburgh (GB); David Alexander Collie, Edinburgh (GB); Adrian John O'Lenskie, Dunblane (GB)

(73) Assignee: Adobe Inc., San Jose, CA (US)

( * ) Notice: Subject to any disclaimer, the term of this patent is extended or adjusted under 35 U.S.C. 154(b) by 133 days.

(21) Appl. No.: 18/186,458

(22) Filed: Mar. 20, 2023

(65) Prior Publication Data

US 2024/0319991 A1    Sep. 26, 2024

(51) Int. Cl.
  *G06F 8/71*    (2018.01)
  *G06F 8/41*    (2018.01)
(52) U.S. Cl.
  CPC . *G06F 8/71* (2013.01); *G06F 8/41* (2013.01)
(58) Field of Classification Search
  CPC .................................. G06F 8/71; G06F 8/41
  USPC .............................. 717/120–141; 706/25–45
  See application file for complete search history.

(56) References Cited

U.S. PATENT DOCUMENTS

| | | | |
|---|---|---|---|
| 6,728,695 B1 * | 4/2004 | Pathria ................ | G06F 40/216 |
| | | | 707/E17.084 |
| 7,219,085 B2 * | 5/2007 | Buck .................... | G06V 10/955 |
| | | | 706/12 |
| 9,058,327 B1 * | 6/2015 | Lehrman .............. | G06F 16/353 |
| 9,990,187 B1 * | 6/2018 | Carroll ................. | G06F 8/30 |
| 10,062,039 B1 * | 8/2018 | Lockett ................ | G06N 3/044 |
| 11,645,054 B2 * | 5/2023 | Yuan .................... | G06F 40/30 |
| | | | 717/136 |
| 11,726,775 B2 * | 8/2023 | Mahanta ............. | G06F 11/3604 |
| | | | 717/122 |
| 11,734,579 B2 * | 8/2023 | Neelamana .......... | G06F 16/248 |
| | | | 706/50 |
| 11,763,189 B2 * | 9/2023 | Golding .............. | G06F 8/10 |
| | | | 706/12 |

(Continued)

OTHER PUBLICATIONS

Balan et al, "Detecting Java Compiled Malware using Machine Learning Techniques", IEEE, pp. 435-439 (Year: 2018).*

(Continued)

*Primary Examiner* — Anil Khatri
(74) *Attorney, Agent, or Firm* — FIG. 1 Patents (57) ABSTRACT

In implementations of systems for generating review likelihoods for sets of code, a computing device implements a review system to compile input data based on code data describing information associated with a set of new code to be incorporated into a set of existing code and reviewer data describing information associated with a potential reviewer of sets of code. The review system processes the input data using a machine learning model trained on training data to generate review likelihoods for potential reviewers of sets of code to be selected to review sets of new code. A review likelihood for the potential reviewer of sets of code to be selected to review the set of new code is generated using the machine learning model based on processing the input data. The review system generates an indication of the review likelihood for display in a user interface.

20 Claims, 9 Drawing Sheets

(56) References Cited

U.S. PATENT DOCUMENTS

| | | | | |
|---|---|---|---|---|
| 11,775,271 | B1* | 10/2023 | Singh | G06N 3/04 |
| | | | | 717/137 |
| 11,783,062 | B2* | 10/2023 | Lounsberry | G06F 21/6218 |
| | | | | 726/30 |
| 12,001,806 | B1* | 6/2024 | Juneja | G10L 13/00 |
| 12,099,955 | B2* | 9/2024 | Goel | G06Q 10/06375 |
| 12,111,747 | B1* | 10/2024 | Jain | G06F 8/41 |
| 2020/0019493 | A1* | 1/2020 | Ramakrishna | G06F 11/3688 |

OTHER PUBLICATIONS

Clifford et al, "ImpNet: Imperceptible and blackbox-undetectable backdoors in compiled neural networks", IEEE, pp. 344-357 (Year: 2024).*

L'Heureux et al, "Machine Learning With Big Data: Challenges and Approaches", IEEE, pp. 1-22 (Year: 2017).*

Shrestha et al, "Review of Deep Learning Algorithms and Architectures", IEEE, pp. 1-19 (Year: 2019).*

Mange "Effect of Training Data Order for Machine Learning", IEEE, pp. 406-407 (Year: 2019).*

Qu et al, "Sparse Learning for Linear Twin Parameter-margin Support Vector Machine", ACM, pp. 50-55 (Year: 2024).*

"Requesting a pull request review", GitHub Docs, GitHub, Inc. [retrieved Jan. 12, 2023]. Retrieved from the Internet <https://docs.github.com/en/pull-requests/collaborating-with-pull-requests/proposing-changes-to-your-work-with-pull-requests/requesting-a-pull-request-review>., 4 Pages.

McCaslin, Taylor , "The road to smarter code reviewer recommendations", GitLab B.V. [online] [retrieved Jan. 12, 2023]. Retrieved from the Internet <https://about.gitlab.com/blog/2022/01/04/the-road-to-smarter-code-reviewer-recommendations/>., Jan. 4, 2022, 8 Pages.

* cited by examiner

| Reviewer Likelihood for Set of New Code ||| X |
|---|---|---|---|
| Reviewer | Score | Other | |
| gaa 124 | 0.2014088 140 | Low Quality 402 | |
| dco 126 | 0.18989036 142 | ☆ 404 | |
| fra 128 | 0.08712865 144 | ⊙ 406 | |
| mfr 130 | 0.086391635 146 | High Quality 408 | |
| rmc 132 | 0.021139132 148 | N/A 410 | |
| phrm 134 | 0.018980142 150 | N/A 412 | |
| ich 136 | 0.018907715 152 | ⊙ 414 | |
| kah 138 | 0.01880745 154 | ☆ 416 | |

GENERATING REVIEW LIKELIHOODS FOR SETS OF CODE

BACKGROUND

A set of existing code defining existing functionality of an application is controlled (e.g., by versions) to prevent unauthorized changes to the set of existing code which could degrade the existing functionality of the application. In order to add new functionality to the application, an author of a set of new code defining the new functionality selects a reviewer from a group of potential reviewers to review the set of new code. The selected reviewer reviews/analyzes the set of new code based on various criteria. If the reviewer determines that the various criteria are satisfied, then the set of new code is incorporated into the set of existing code to add the new functionality to the application.

SUMMARY

Techniques and systems for generating review likelihoods for sets of code are described. In an example, a computing device implements a review system to compile input data based on code data describing information associated with a set of new code to be incorporated into a set of existing code and reviewer data describing information associated with a potential reviewer of sets of code. For instance, the potential reviewer has previously authored or reviewed a set of code to be incorporated into another set of code.

The review system processes the input data using a machine learning model trained on training data to generate review likelihoods for potential reviewers of sets of code to be selected to review sets of new code. For example, a review likelihood for the potential reviewer of sets of code to be selected to review the set of new code is generated using the machine learning model based on processing the input data. The review system generates an indication of the review likelihood for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

A set of new code defining new functionality for an application is reviewed and approved by a reviewer (or multiple reviewers) before the set of new code is incorporated/merged into a set of existing code defining existing functionality of the application. If the review process is successful, then any issues/problems in the set of new code are detected and resolved during the review, and risks of adversely affecting the existing functionality of the application are minimized. Factors that increase or decrease a likelihood of a successful review of the set of new code include technical capabilities of the reviewer generally, competency of the reviewer with respect to the set of existing code, competency of the reviewer with respect to sets of code that are similar to the set of new code, availability of the reviewer, and so forth.

However, conventional systems are not capable of identifying candidate reviewers from thousands of potential reviewers of sets of code that are likely to be associated with a successful review of a particular set of new code. Instead, an author of the particular set of new code selects a candidate reviewer from the thousands of potential reviewers based on the author's discretion. As a result, the candidate reviewer may be unqualified to review the particular set of new code, unavailable to review the particular set of new code, etc. In order to overcome these limitations, techniques and systems for generating review likelihoods for sets of code are described.

In an example, a computing device implements a review system to compile input data based on code data describing information associated with a set of new code to be incorporated into a set of existing code and reviewer data describing information associated with a potential reviewer of sets of code. For instance, the set of existing code is included in a target repository and the review system compiles the input data as describing numbers of sets of code authored/reviewed by the potential reviewer that are also included in the target repository. The compiled input data also describes numbers of lines of files changed by the set of new code and numbers of lines of the files changed by sets of code authored/reviewed by the potential reviewer.

For example, the review system processes the input data using a machine learning model trained on training data to generate review likelihoods for potential reviewers of sets of code to be selected to review sets of new code. In one example, the machine learning model includes a feedforward neural network and the training data describes reviews of thousands of sets of code included in thousands of different repositories. In order to generate review likelihoods for potential reviewers to be selected to review sets of new code, outputs from the machine learning model are interpolated using an interpolation function that is calibrated based on the training data. The interpolated outputs represent probabilities of selection of the potential reviewers to review the sets of new code. In some examples, in order to ensure that the probabilities of selection increase in response to increases in statistics associated with the potential reviewers, the review system causes linear layers of the machine learning model to have positive values for weights and biases. Accordingly, in these examples, an output from the machine learning model increases monotonically based on the positive values for weights and biases.

The review system generates a review likelihood for the potential reviewer of sets of code to be selected to review the set of new code using the machine learning model based on processing the input data. For instance, the review likelihood for the potential reviewer represents a suitability of the potential reviewer for reviewing the set of new code and is comparable to a review likelihood generated for an additional potential reviewer to determine whether the potential reviewer or the additional potential reviewer is more likely to be associated with a successful review of the set of new code. The review system generates an indication of the review likelihood for the potential reviewer for display in a user interface, e.g., relative to an indication of the review likelihood for the additional potential reviewer.

Unlike conventional systems which are not capable of identifying candidate reviewers from thousands of potential reviewers that are more or less likely to be associated with a successful review of a particular set of new code, the described systems are capable of generating indications of additional information associated with the potential reviewer such as normal working hours of the potential reviewer, a local time zone of the potential reviewer, an expected quality of a review of the set of new code performed by the potential reviewer, etc. By generating review likelihoods for potential reviewers to be selected to review a set of code, the described systems facilitate selection of a reviewer based on objective information which improves conventional systems that facilitate selection of the reviewer based on discretion of an author of the set of code. This decreases a risk that an issue/problem in the set of code is not detected/resolved before incorporating the set of code into a set of existing code which is a further improvement relative to the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

Figure 1:
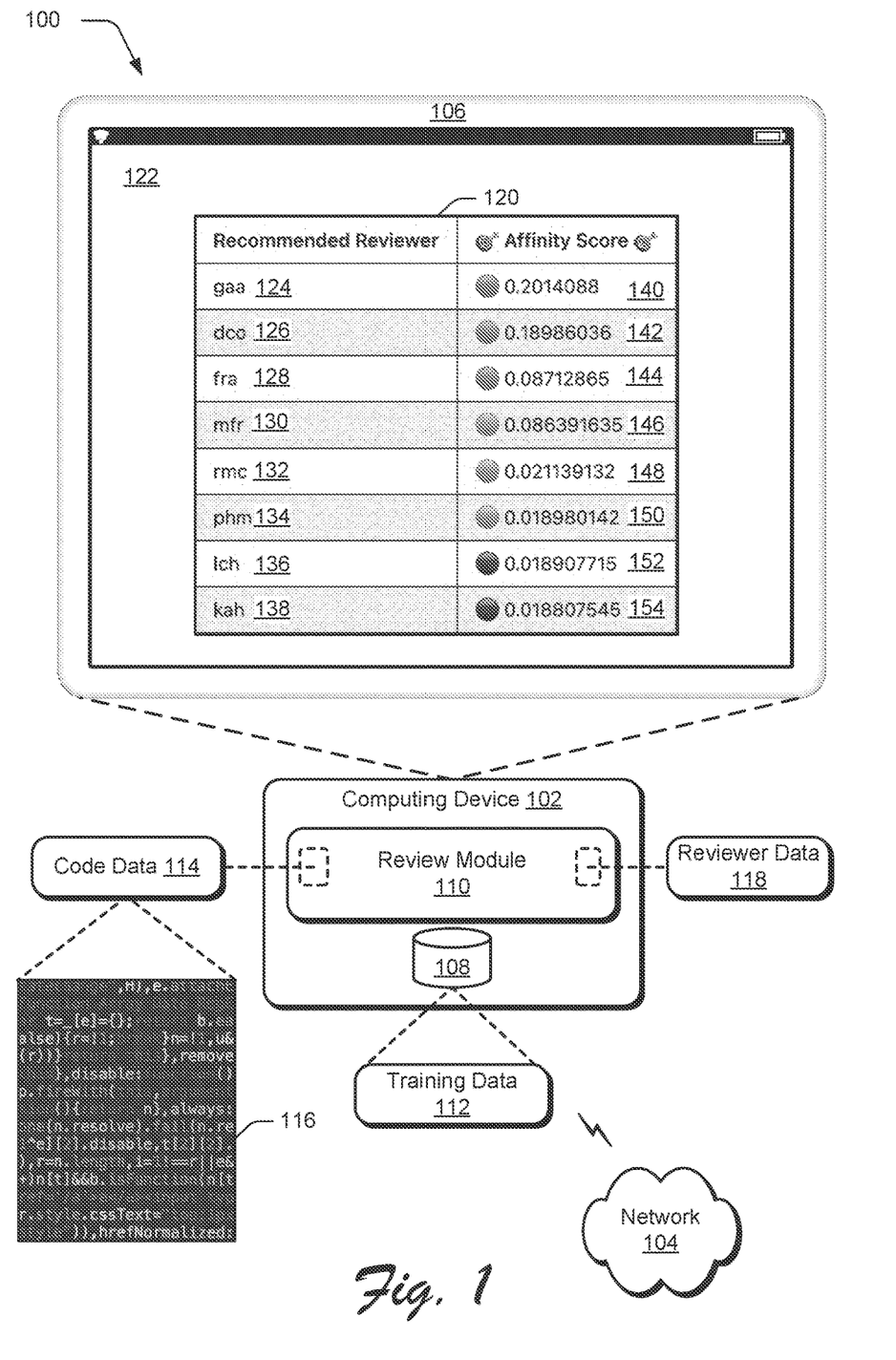
FIG. 1 is an illustration of an environment in an example implementation that is operable to employ digital systems and techniques for generating review likelihoods for sets of code as described herein.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For instance, the computing device 102 includes a storage device 108 and a review module 110. The storage device 108 is illustrated to include training data 112 which describes information associated with thousands of different reviewers selected (and not selected) to review thousands of sets of new code to be incorporated into sets of existing code such as an amount of code overlap (if any) between the sets of new code and sets of code authored or reviewed by reviewers selected to review the sets of new code, an amount of code overlap (if any) between the sets of new code and sets of code authored or reviewed by reviewers not selected to review the sets of new code, numbers of sets of code authored or reviewed by reviewers selected to review the sets of new code, numbers of sets of code authored or reviewed by reviewers not selected to review the sets of new code, numbers of reviewed sets of code authored by authors of the sets of new code, numbers of sets of code reviewed by authors of the sets of new code, numbers of sets of code reviewed jointly by authors of the sets of new code and reviewers selected to review the sets of new code, numbers of sets of code reviewed jointly by authors of the sets of new code and reviewers not selected to review the sets of new code, and so forth. In an example, the review module 110 leverages the training data 112 to train a machine learning model that is included in or accessible to the review module 110.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In an example, the machine learning model includes a feedforward neural network. In this example, the review module 110 trains the machine learning model on the training data 112 to generate review likelihoods for potential reviewers of sets of code to be selected to review sets of new code. For example, the potential reviewers of sets of code include each author of a set of code to be incorporated into a set of existing code as well as each reviewer of a set of code to be incorporated into a set of existing code.

As shown, the review module 110 is illustrated as having, receiving, and/or transmitting code data 114 which describes information associated with a set of new code 116 that is to be incorporated into a set of existing code. For example, the set of new code 116 defines new functionality for an application and the set of existing code defines existing functionality for the application. By way of example, the code data 114 describes an author of the set of new code 116, other sets of code authored or reviewed by the author of the set of new code 116, numbers of lines of particular reference files changed by the set of new code 116, etc.

For instance, the review module 110 is also illustrated as having, receiving, and/or transmitting reviewer data 118 that describes information associated with a potential reviewer of sets of code. In an example, the reviewer data 118 describes sets of code authored by the potential reviewer, sets of code reviewed by the potential reviewer, numbers of lines of particular reference files changed by the sets of code authored by the potential reviewer, numbers of lines of particular reference files changed by the sets of code reviewed by the potential reviewer, an availability of the potential reviewer, an unavailability of the potential reviewer, an estimated quality of review for sets of code reviewed by the potential reviewer, an average number of working hours of the potential reviewer, a local time zone of the potential reviewer, a number of uncompleted reviews of sets of code to be reviewed by the potential reviewer, and so forth. For example, the review module 110 receives and processes the code data 114 and the reviewer data 118 to compile input data for processing using the trained machine learning model.

To do so in one example, the review module 110 generates the input data as describing a number of historic sets of new code authored by the potential reviewer in a target repository and in all repositories; a number of historic sets of new code reviewed by the potential reviewer in the target repository and in all of the repositories; a number of historic sets of new code authored by the author of the set of new code 116 in the target repository and in all of the repositories; a number of historic sets of new code reviewed by the author of the set of new code 116 in the target repository and in all of the repositories; a number of historic sets of new code reviewed jointly by the potential reviewer and the author of the set of new code 116; an availability of the potential reviewer; an expected quality of a review of the set of new code 116 by the potential reviewer; average working hours of the potential reviewer; a local time zone of the potential reviewer; a number of uncompleted reviews of sets of new code to be performed by the potential reviewer; a code overlap (if any) between the set of new code 116 and historic sets of new code authored by the potential reviewer; and a code overlap (if any) between the set of new code 116 and historic sets of new code reviewed by the potential reviewer. For example, the review module 110 computes a code overlap between the set of new code 116 and a particular set of code authored/reviewed by the potential reviewer by generating a first line change vector for the set of new code 116 and a second line change vector for the particular set of code. In this example, the first line change vector is an ordered list of numbers of line changes in files that are changed by the set of new code 116 and the second line change vector is an order list of numbers of changes in the files that are changed by the particular set of code.

The review module 110 determines the code overlap between the set of new code 116 and the particular set of code by computing a scalar (dot) product of the first line change vector and the second line change vector. In some examples, the review module 110 applies weights to the first line change vector and/or the second line change vector such that 10 lines changed in a file is weighted greater/higher than 1 line changed in the file (e.g., weighted 10 times greater/higher). In other example, the review module 110 does not apply weights to the first line change vector and/or the second line change vector such that 10 lines changed in the file is weighted equally (e.g., is unweighted) relative to 1 line changed in the file.

For example, the review module 110 computes a code overlap between the set of new code 116 and each of the sets of code authored by the potential reviewer and each of the sets of code reviewed by the potential reviewer. The review module 110 sums the computed code overlaps, and the review module 110 generates the input data as describing the sum. For instance, a relatively high value of the sum indicates that the author of the set of new code 116 and the potential reviewer have changed lines of code in same ones of the files. Conversely, a relatively low value of the sum indicates that the author of the set of new code 116 and the potential reviewer have not changed lines of code in the same ones of the files (e.g., have changed lines of code in less than a threshold number of the same ones of the files).

In an example, after compiling the input data based on the code data 114 and the reviewer data 118, the review module 110 processes the input data using the machine learning model trained on the training data 112 to generate an indication 120 of review likelihoods which is displayed in a user interface 122 of the display device 106. As shown, the indication 120 includes indications 124-138 of potential reviewers and corresponding indications 140-154 of review likelihoods for the potential reviewers. For example, a user interacts with an input device (e.g., a stylus, a keyboard, a mouse, a touchscreen, etc.) relative to the user interface 122 to select a particular potential reviewer to review the set of new code 116 by interacting with one of the indications 124-138 corresponding to the particular potential reviewer.

Figure 2:
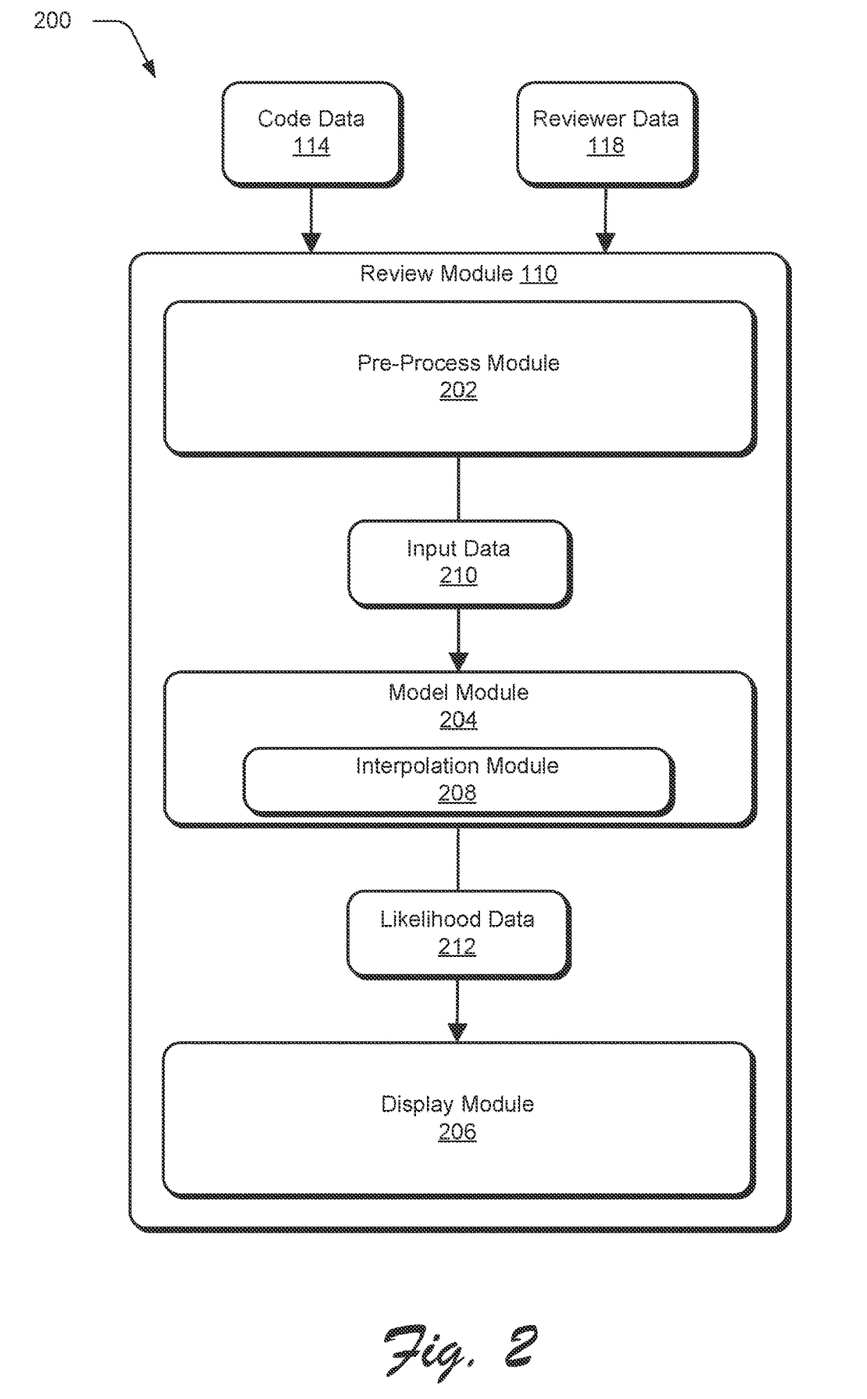
FIG. 2 depicts a system in an example implementation showing operation of a review module for generating review likelihoods for sets of code.

FIG. 2 depicts a system 200 in an example implementation showing operation of a review module 110. The review module 110 is illustrated to include a pre-process module 202, a model module 204, and a display module 206. For example, the model module 204 includes an interpolation module 208 for scaling an output of the machine learning model which is included in or available to the model module 204. The pre-process module 202 receives and processes the code data 114 and the reviewer data 118 to generate input data 210.

Figure 3:
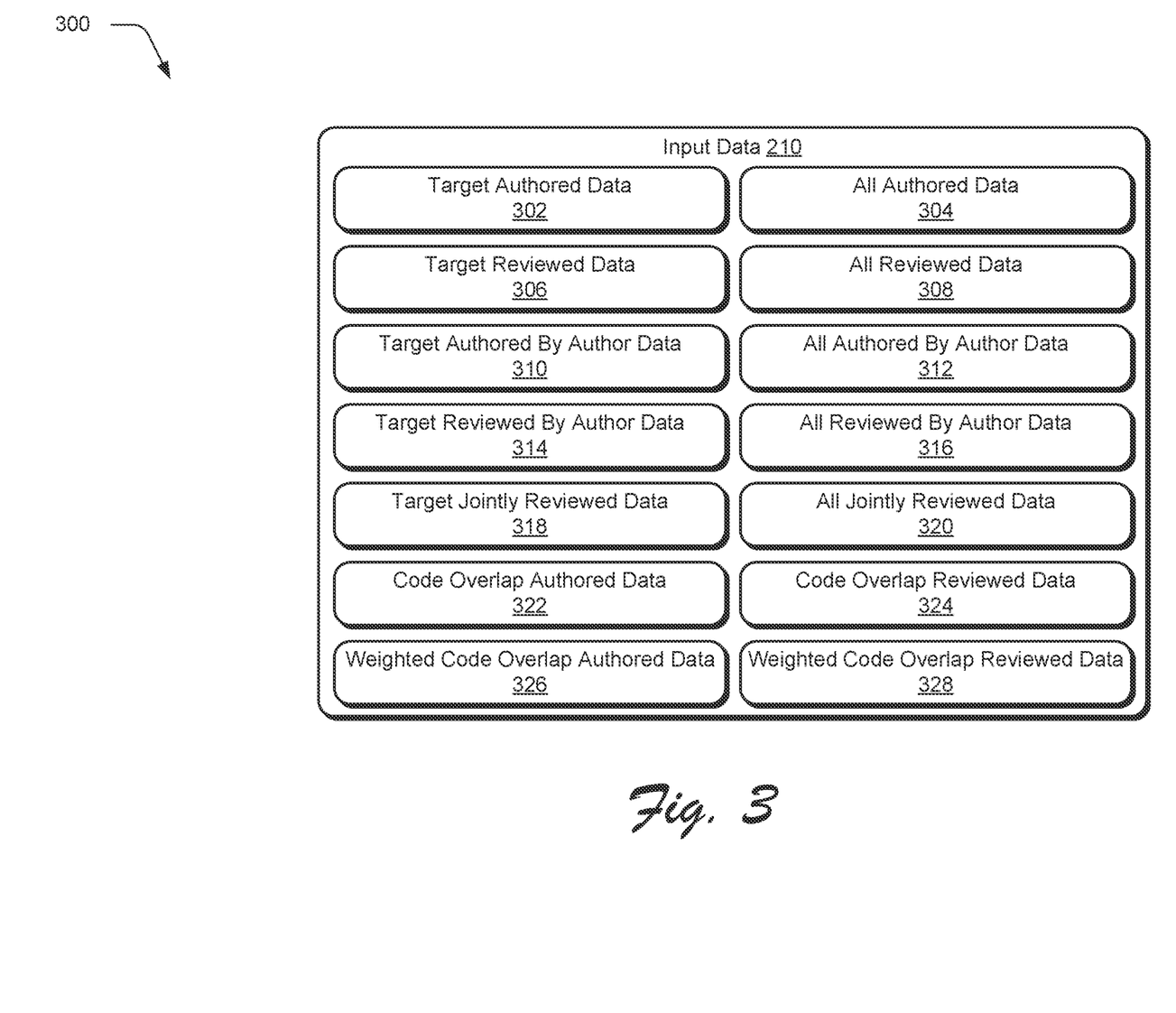
FIG. 3 illustrates a representation of compiled input data.

FIG. 3 illustrates a representation 300 of compiled input data. For example, the representation 300 includes the input data 210 compiled by the pre-process module 202 from the code data 114 and the reviewer data 118. The input data 210 is illustrated to include target authored data 302, all authored data 304, target reviewed data 306, all reviewed data 308, target authored by author data 310, all authored by author data 312, target reviewed by author data 314, all reviewed by author data 316, target jointly reviewed data 318, all jointly reviewed data 320, code overlap authored data 322, code overlap reviewed data 324, weighted code overlap authored data 326, and weighted code overlap reviewed data 328.

For instance, the pre-process module 202 generates the target authored data 302 as describing a total number of historic sets of code authored by the potential reviewer which are included in a target repository for the set of new code 116. The pre-process module 202 generates the all authored data 304 as describing a total number of historic sets of code authored by the potential reviewer that are included in all repositories. In an example, the pre-process module 202 generates the target reviewed data 306 as describing a total number of historic sets of code reviewed by the potential reviewer which are included in the target repository, and the pre-process module 202 generates the all reviewed data 308 as describing a total number of historic sets of code reviewed by the potential reviewer that are included in all of the repositories.

In one example, the pre-process module 202 generates the target authored by author data 310 as describing a total number of historic sets of code authored by the author of the set of new code 116 that are included in the target repository. In this example, the pre-process module 202 generates the all authored by author data 312 as describing a total number of historic sets of code authored by the author of the set of new code 116 which are included in all of the repositories. In a similar example, the pre-process module 202 generates the target reviewed by author data 314 as describing a total number of historic sets of code reviewed by the author of the set of new code 116 that are included in the target repository, and the pre-process module 202 generates the all reviewed by author data 316 as describing a total number of historic sets of code reviewed by the author of the set of new code 116 which are included in all of the repositories. In some examples, the pre-process module 202 generates the target jointly reviewed data 318 as describing a total number of historic sets of code jointly reviewed by the potential reviewer and the author of the set of new code 116 that are included in the target repository. For example, the pre-process module 202 generates the all jointly reviewed data 320 as describing a total number of historic sets of code jointly reviewed by the potential reviewer and the author of the set of new code 116 which are included in all of the repositories.

In order to generate the code overlap authored data 322, the pre-process module 202 generates a new code line change vector for the set of new code 116 which is an ordered list of numbers of line changes in files that are changed by the set of new code 116. By way of example, if the set of new code 116 changes 20 lines of code of a first file, 15 lines of code of a second file, and 35 lines of code of a third file, then the pre-process module 202 generates the new code line change vector as [1, 1, 1, . . . ], and the pre-process module 202 also generates a weighted new code line change vector as [20, 15, 35, . . . ]. For example, the pre-process module 202 generates an authored line change vector for each of the historic sets of code authored by the potential reviewer. Each of the authored line change vectors is an ordered list of numbers of line changes in files that are changed by a corresponding historic set of code authored by the potential reviewer. In one example, if a particular historic set of code authored by the potential reviewer changes 7 lines of code of the first file, zero lines of code of the second file, and 11 lines of code of the third file, then the pre-process module 202 generates an authored line change vector for the particular historic set of code as [1, 0, 1, . . . ], and the pre-process module 202 also generates a weighed authored line change vector for the particular historic set of code as [7, 0, 11, . . . ].

In some examples, the pre-process module 202 normalizes the new code line change vector, the authored line change vectors, or the new code line change vector and the authored line change vectors. In an example, the pre-process module 202 determines a code overlap between the set of new code 116 and each of the historic sets of code authored by the potential reviewer by computing a scalar (dot) product between the new code line change vector and each of the authored line change vectors. The pre-process module 202 generates the code overlap authored data 322 as describing a sum of the code overlaps between the set of new code 116 and each of the historic sets of code authored by the potential reviewer. For instance, if a value of the sum of the code overlaps is relatively large, then this indicates that the author of the set of new code 116 and the potential reviewer have modified lines of code in the same files.

In order to generate the code overlap reviewed data 324 in one example, the pre-process module 202 generates a reviewed line change vector for each of the historic sets of code reviewed by the potential reviewer. Each of the reviewed line change vectors is an ordered list of numbers of line changes in files that are changed by a corresponding historic set of code reviewed by the potential reviewer. In one example, if a specific historic set of code reviewed by the potential reviewer changes zero lines of code of the first file, 70 lines of code of the second file, and 1 line of code of the third file, then the pre-process module 202 generates a reviewed line change vector for the specific historic set of code as [0, 1, 1, . . . ], and the pre-process module 202 also generates a weighted reviewed line change vector for the specific historic set of code as [0, 70, 1, . . . ]. For example, the pre-process module 202 determines a code overlap between the set of new code 116 and each of the historic sets of code reviewed by the potential reviewer by computing a scalar (dot) product between the new code line change vector and each of the reviewed line change vectors. The pre-process module 202 generates the code overlap reviewed data 324 as describing a sum of the code overlaps between the set of new code 116 and each of the historic sets of code reviewed by the potential reviewer.

The pre-process module 202 generates the weighted code overlap authored data 326 in a same manner as the code overlap authored data 322 except that for the weighted code overlap authored data 326, the pre-process module 202 determines a weighted code overlap between the set of new code 116 and each of the historic sets of code authored by the potential reviewer by computing a scalar (dot) product between the weighted new code line change vector and each of the weighted authored line change vectors. For example, the pre-process module 202 generates the weighted code overlap authored data 326 as describing a sum of the weighted code overlaps between the set of new code 116 and each of the historic sets of code authored by the potential reviewer. Similarly, the pre-process module 202 generates the weighted code overlap reviewed data 328 in a same manner as the code overlap reviewed data 324 except that for the weighted code overlap reviewed data 328, the pre-process module 202 determines a weighted code overlap between the set of new code 116 and each of the historic sets of code reviewed by the potential reviewer by computing a scalar (dot) product between the weighted new code line change vector and each of the weighted reviewed line change vectors. In an example, the pre-process module 202 generates the weighted code overlap reviewed data 328 as describing a sum of the weighted code overlaps between the set of new code 116 and each of the historic sets of code reviewed by the potential reviewer.

In some examples, the pre-process module 202 applies exponential weights to the historic sets of code with a tunable half-life (e.g., 21 days). The exponential weights decrease over time such that scores generated by the review module 110 are reduced for inactive potential reviewers. For example, the pre-process module 202 generates the input data 210 as describing additional information about the potential reviewer such as an availability of the potential reviewer (e.g., scheduled time off, average working hours, a number of current reviews, local time zone information, etc.), an expected quality of review, a number of uncompleted reviews for sets of code to be performed by the potential reviewer, and so forth.

The model module 204 receives the input data 210 and implements the machine learning model to process the input data 210 to generate likelihood data 212. For example, the machine learning model is included in or available to the model module 204, and the machine learning model is trained on the training data 112 to generate review likelihoods for potential reviewers of sets of code to be selected to review sets of new code. In this example, the machine learning model includes the feedforward neural network.

In an example, the feedforward neural network has multiple layers that each include a one dimensional batch normalization, a linear transform, and a rectified linear unit. In some examples, the feedforward neural network includes layers of size 14×200×50×50×10×1 and the input data 210 describes 14 input statistics which are processed to generate one output score as an output. Consider an example in which the model module 204 causes the output from the feedforward neural network to be monotonically increasing by constraining each linear layer of the network to have only positive values for weights and biases. In this example, the monotonically increasing output does not affect accuracy of the output and also ensures that if the input statistics described by the input data 210 increase for a particular potential reviewer, then an output score for the particular potential reviewer also increases. For example, the interpolation module 208 processes the output score using an interpolating function to generate the likelihood data 212 as describing a value representative of a probability of the potential reviewer being selected to review the set of new code 116. In one example, the interpolating function is calibrated based on the training data 112 such that the value described by the likelihood data 212 corresponds to a review likelihood for the potential reviewer to be selected to review the set of new code 116.

Figure 4:
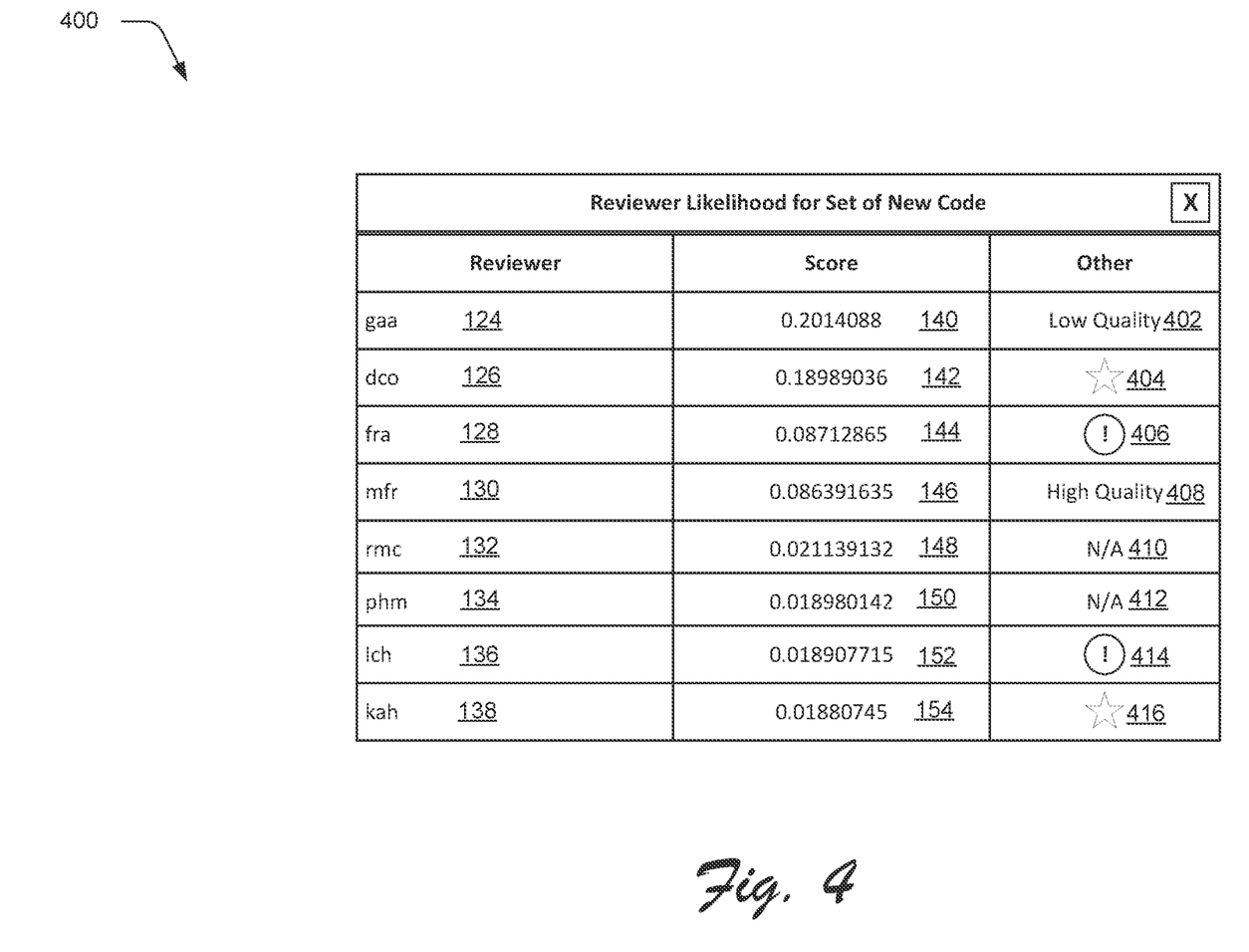
FIG. 4 illustrates a user interface for generating review likelihoods for sets of code.

FIG. 4 illustrates a user interface 400 for generating review likelihoods for sets of code. For instance, the display module 206 receives the likelihood data 212 as describing the review likelihood for the potential reviewer as well as review likelihoods for other potential reviewers to be selected to review the set of new code 116. The display module 206 processes the likelihood data 212 to generate the indications 124-138 of potential reviewers and the corresponding indications 140-154 of review likelihoods for the potential reviewers which are displayed in the user interface 400. In an example, the display module 206 also generates and displays indications 402-416 of additional information in the user interface 400 based on the likelihood data 212.

As shown, indication 124 identifies a potential reviewer "gaa" as having a review likelihood for the set of new code 116 conveyed by indication 140 as 0.2014088 which is higher than review likelihoods conveyed by the indications 142-154. However, indication 402 conveys that a quality of a review of the set of new code 116 performed by the potential reviewer "gaa" would likely be of "Low Quality." Indication 126 identifies a potential reviewer "dco" as having a review likelihood for the set of new code 116 conveyed by indication 142 as 0.18989036 and indication 404 conveys that the potential reviewer "dco" has availability to review sets of new code.

Indication 144 indicates a review likelihood of 0.08712865 for a potential reviewer identified by indication 128 as "fra" to be selected to review the set of new code 116. The potential reviewer "fra" is not available for reviewing sets of new code which is indicated by indication 406. For instance, indication 130 identifies a potential reviewer "mfr" as having a review likelihood for being selected to review the set of new code 116 of 0.086391635 which is conveyed by indication 146. Indication 408 indicates that a quality of a review of the set of new code 116 performed by the potential reviewer "mfr" would likely be of "High Quality."

A potential reviewer "rmc" identified by indication 132 has a review likelihood of 0.021139132 for the set of new code 116 which is indicated by indication 148. Indication 410 conveys that no additional information regarding review quality/availability is available for the potential reviewer "rmc." Similarly, indication 412 conveys that no additional information regarding review quality/availability is available for a potential reviewer identified by indication 134 as "phm." Indication 150 indicates a review likelihood for the potential reviewer "phm" to be selected to review the set of new code 116 is about 0.018980142.

Indication 136 identifies a potential reviewer "Ich" for the set of new code 116 as having a review likelihood of 0.018907715 which is conveyed by indication 152. However, indication 414 indicates that the potential reviewer "Ich" is not available for reviewing sets of new code. Conversely, indication 416 conveys that a potential reviewer "kah" identified by indication 138 is available for reviewing sets of new code. The potential reviewer "kah" has a review likelihood for the set of new code 116 conveyed by indication 154 as 0.01880745.

For example, a user such as the author of the set of new code 116 manipulates an input device (e.g., a mouse, a stylus, a keyboard, a touchscreen, etc.) relative to the user interface 400 to interact with the indication 126 to select the potential reviewer "dco" as a reviewer of the set of new code 116. In this example, when the user selects the potential reviewer "dco," the review module 110 receives data describing the interaction with the indication 126 and processes the data to assign the potential reviewer "dco" as the reviewer of the set of new code 116. In this manner, the user selects the potential reviewer "dco" based on the review likelihood indicated by the indication 142 and the availability to review the set of new code 116 indicated by the indication 404. This is not possible using conventional systems which are not capable of generating review likelihoods for potential reviewers of a particular set of code such as the set of new code 116.

Figure 5:
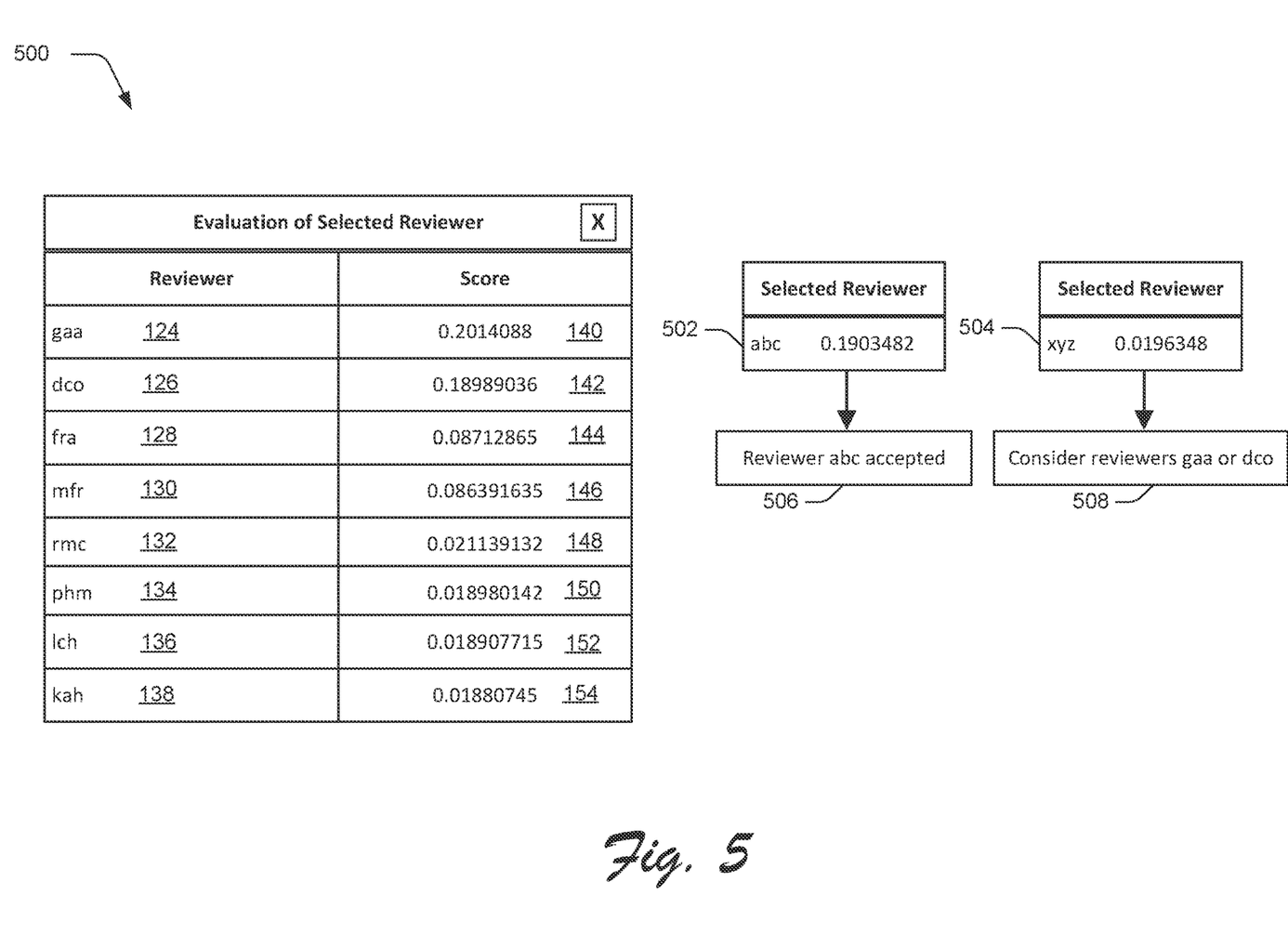
FIG. 5 illustrates a user interface for evaluating selected reviewers.

FIG. 5 illustrates a user interface 500 for evaluating selected reviewers. The user interface 500 includes the indications 124-138 of the potential reviewers and the corresponding indications 140-154 of the review likelihoods for the potential reviewers. As shown, the user interface 500 also includes an indication 502 of a first selected reviewer and an indication 504 of a second selected reviewer. For instance, the first selected reviewer "abc" has a review likelihood of 0.1903482 for the set of new code 116 and the second selected reviewer "xyz" has a review likelihood of 0.0196348 for the set of new code 116.

In an example, the review module 110 compares the review likelihood for the first selected reviewer "abc" with the review likelihoods conveyed by the indications 140-154. Based on this comparison, the review module 110 determines that the review likelihood for the first selected reviewer "abc" is greater than the review likelihood conveyed by the indication 142 and nearly as high as the review likelihood conveyed by the indication 140. The review module 110 infers that the first selected reviewer "abc" is qualified to review the set of new code 116, and the display module 206 generates an indication 506 which states "Reviewer abc accepted."

Similarly, the review module 110 compares the review likelihood for the second selected reviewer "xyz" with the review likelihoods conveyed by the indications 140-154.

The review module 110 determines that the review likelihood for the second selected reviewer "xyz" is less than the review likelihood conveyed by the indication 148. For example, the review module 110 infers that the second selected reviewer "xyz" is not qualified to review the set of new code 116, and the display module 206 generates an indication 508. As shown, the indication 508 state "Consider reviewers gaa or dco." Accordingly, the review module 110 suggests the potential reviewer "gaa" identified by the indication 124 or the potential reviewer "dco" identified by the indication 126 as alternatives to the second selected reviewer "xyz" that is not qualified to review the set of new code 116.

Figure 6:
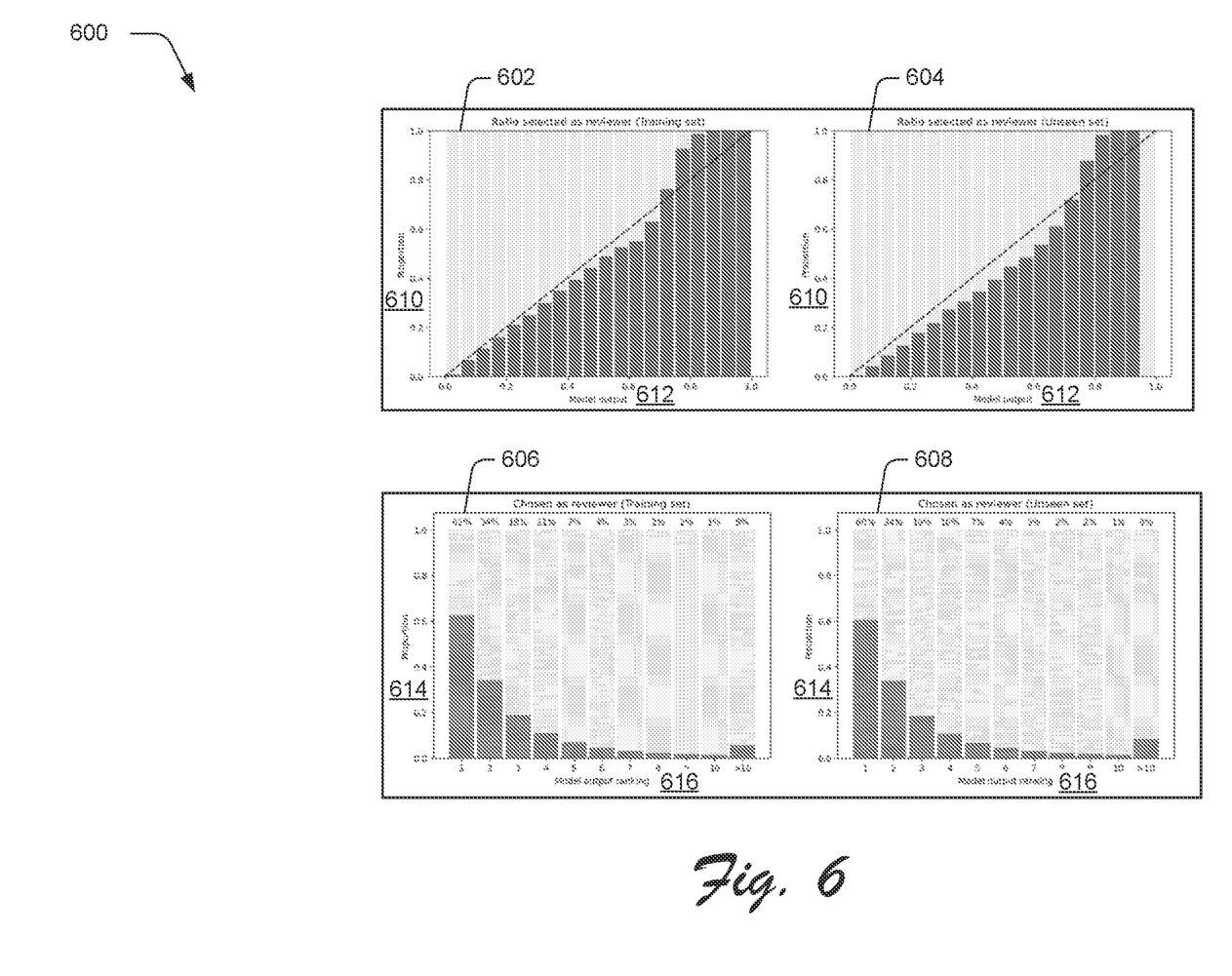
FIG. 6 illustrates a representation of training data and testing data.

FIG. 6 illustrates a representation 600 of training data and testing data. The representation 600 includes charts 602-608. For instance, charts 602, 564 and charts 606, 608 collectively illustrate 125,123 requests to incorporate sets of new code into sets of existing code spanning 1,754 repositories with 5,199,687 potential reviewers of the sets of new code. The chart 602 and the chart 606 illustrate the training data 112 which includes 1,530 repositories. The chart 604 and the chart 608 illustrate testing data which includes the remaining 224 repositories.

As shown, the charts 602 and 604 depict ratios selected as reviewers in terms of proportion 610 and model output 612 of the review module 110 for the training data 112 and the testing data, respectively. The charts 606 and 606 depict percentages chosen as reviewers in terms of proportion 614 and model output ranking 616 of the review module 110 for the training data 112 and the testing data, respectively. Because of the interpolation performed by the interpolation module 208 (which is calibrated using the training data 112), the review likelihoods generated by the review module 110 correspond to a probability of a potential reviewer being selected to review a set of code which is confirmed via the charts 602-608. For example, more than one potential reviewer is normally selected to review a set of code, and most of the time (more than 50 percent) a potential reviewer having a highest review likelihood for a particular set of code is among reviewers selected to review the particular set of code. A potential reviewer outside of a top 10 ranked reviewers is selected to review a specific set of code around 8 percent of the time. These results indicate that the review module 110 is capable of accurately predicting probable review candidates for reviewing sets of code.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
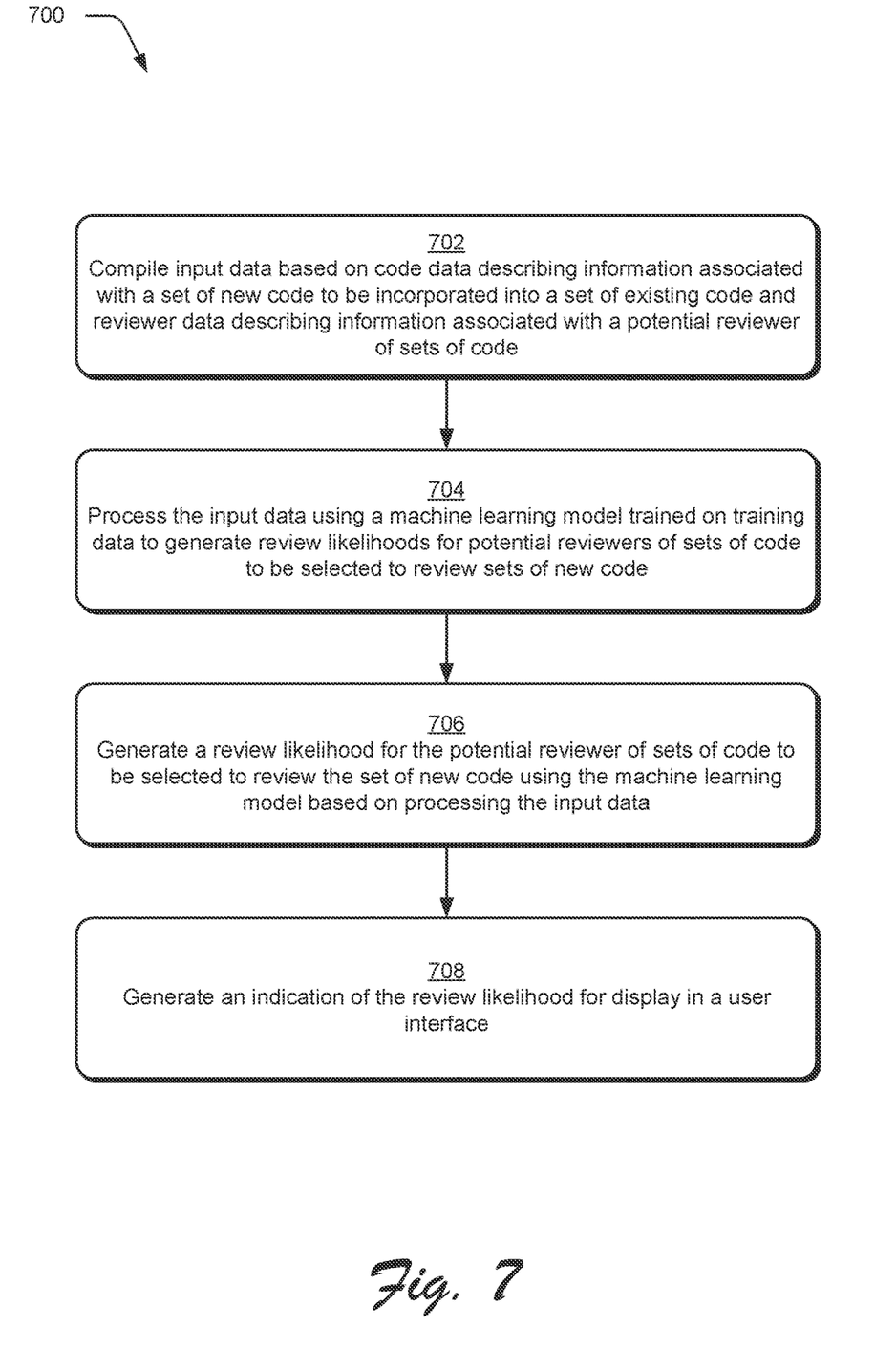
FIG. 7 is a flow diagram depicting a procedure in an example implementation in which an indication of a review likelihood is generated for a potential reviewer of sets of code.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which an indication of a review likelihood is generated for a potential reviewer of sets of code.

Input data is compiled based on code data describing information associated with a set of new code to be incorporated into a set of existing code and reviewer data describing information associated with a potential reviewer of sets of code (block 702). For example, the computing device 102 implements the review module 110 to compile the input data. The input data is processed using a machine learning model trained on training data to generate review likelihoods for potential reviewers of sets of code to be selected to review sets of new code (block 704). The review module 110 processes the input data using the machine learning model in one example.

A review likelihood for the potential reviewer of sets of code to be selected to review the set of new code is generated using the machine learning model based on processing the input data (block 706). In an example, the review module 110 generates the review likelihood. An indication of the review likelihood is generated for display in a user interface (block 708). For example, the computing device 102 implements the review module 110 to generate the indication of the review likelihood.

Figure 8:
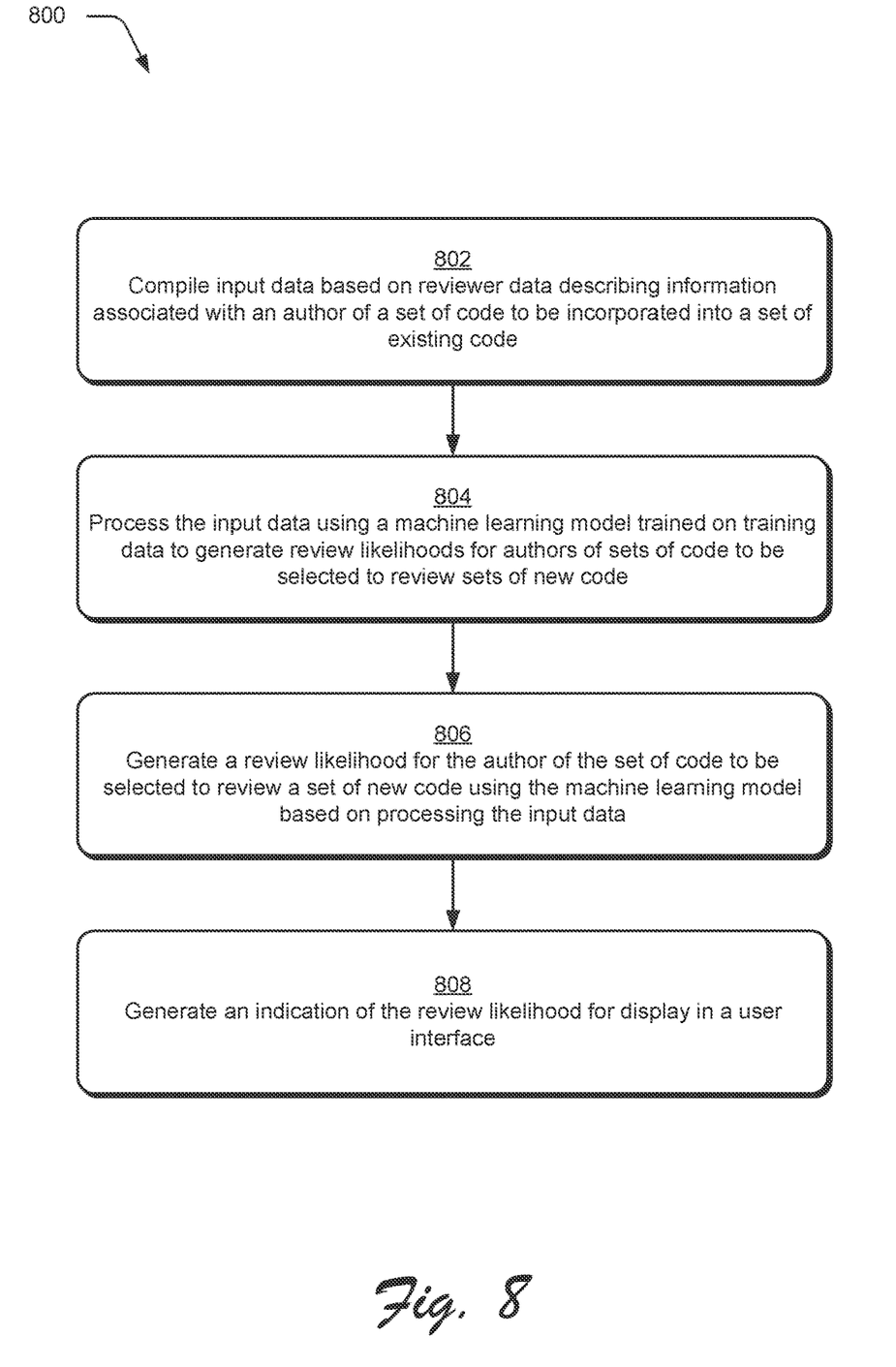
FIG. 8 is a flow diagram depicting a procedure in an example implementation in which an indication of a review likelihood is generated for an author of a set of code.

FIG. 8 is a flow diagram depicting a procedure 800 in an example implementation in which an indication of a review likelihood is generated for an author of a set of code. Input data is compiled based on reviewer data describing information associated with an author of a set of code to be incorporated into a set of existing code (block 802). In some examples, the review module 110 compiles the input data.

The input data is processed using a machine learning model trained on training data to generate review likelihoods for authors of sets of code to be selected to review sets of new code (block 804). In one example, the computing device 102 implements the review module 110 to process the input data using the machine learning model. A review likelihood for the author of the set of code to be selected to review a set of new code is generated using the machine learning model based on processing the input data (block 806). For example, the review module 110 generates the review likelihood using the machine learning model. An indication of the review likelihood is generated for display in a user interface (block 808). The review module 110 generates the indication of the review likelihood in an example.

Example System and Device

Figure 9:
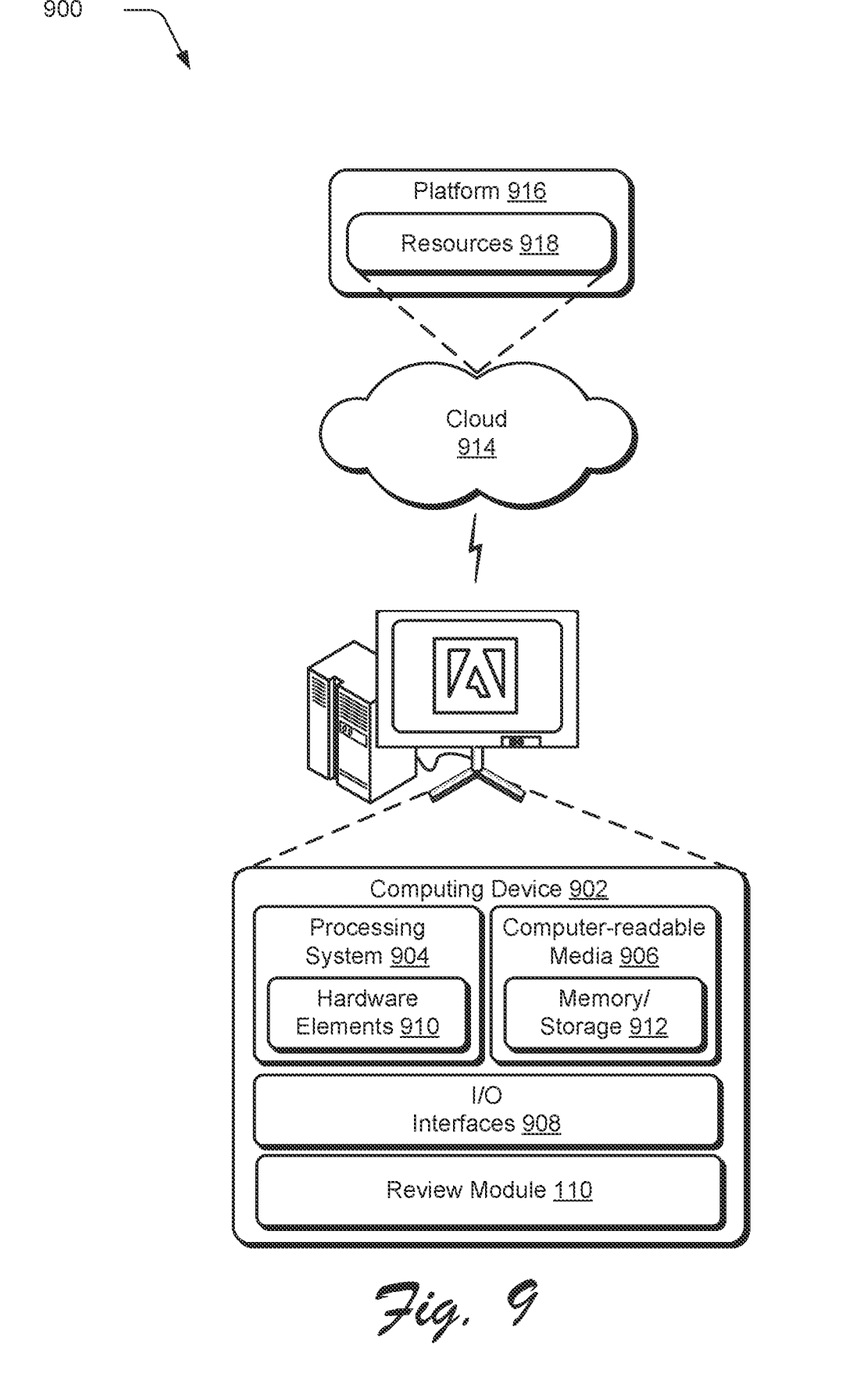
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the review module 110. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

Conclusion

Although implementations of systems for generating review likelihoods for sets of code have been described in language specific to structural features and/or methods, it is to be understood that the appended claims are not necessarily limited to the specific features or methods described. Rather, the specific features and methods are disclosed as example implementations of systems for generating review likelihoods for sets of code, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, input data including code data describing information associated with a set of code to be incorporated into a set of existing code and reviewer data describing information associated with one or more candidate reviewers;
generating, by the processing device, a review likelihood, respectively, for the one or more candidate reviewers for selection to review the set of code, the generating using a machine learning model based on processing the input data; and
generating, by the processing device, an indication of the review likelihood for display in a user interface.

2. The method as described in claim 1, wherein the machine learning model includes a feedforward neural network.

3. The method as described in claim 2, wherein the feedforward neural network has a monotonically increasing output.

4. The method as described in claim 1, wherein the input data includes code overlap data computed as a scalar product of a first line change vector and a second line change vector, the first line change vector representing numbers of lines of code changed in reference files by the set of code and the second line change vector representing numbers of lines of code changed in the reference files, historically, for the set of code.

5. The method as described in claim 4, wherein the candidate reviewer are associated with a historic set of code as an author.

6. The method as described in claim 4, wherein the one or more candidate reviewers are associated with a historic set of code as a reviewer.

7. The method as described in claim 1, wherein the input data describes at least one of a number of sets of code, historically, authored respectively by the one or more candidate reviewers.

8. The method as described in claim 1, wherein the input data describes a number of historic sets of code reviewed respectively by the one or more candidate reviewers.

9. The method as described in claim 1, wherein the input data describes a number of historic sets of code jointly reviewed by the one or more candidate reviewers, respectively, and an author of the set of code.

10. The method as described in claim 9, wherein the historic sets of code are weighted with exponential weights that decrease over time.

11. A system comprising:
a memory component; and
a processing device coupled to the memory component, the processing device to perform operations comprising:
receiving input data based on reviewer data describing information associated with an author of a set of code; and
generating a review likelihood for the author indicating suitability of the author for code review using a machine learning model based on processing the input data.

12. The system as described in claim 11, wherein the input data is compiled based on code data describing information associated with a set of code to be reviewed by the author.

13. The system as described in claim 11, wherein the machine learning model includes a feedforward neural network.

14. The system as described in claim 11, wherein the review likelihood is generated by interpolating an output of the machine learning model.

15. The system as described in claim 14, wherein interpolating the output of the machine learning model is calibrated based on training data.

16. A non-transitory computer-readable storage medium storing executable instructions, that responsive to execution by a processing device, causes the processing device to perform operations comprising:
receiving input data based on code data describing information associated with a set of code and reviewer data describing information associated with one or more candidate reviewers;
generating a review likelihood, respectively, for the one or more candidate reviewers of a likelihood of successful review of the set of code using a machine learning model based on processing the input data.

17. The non-transitory computer-readable storage medium as described in claim 16, wherein the input data includes code overlap data computed as a scalar product of a first line change vector and a second line change vector, the first line change vector representing numbers of lines of code changed in reference files by the set of code and the second line change vector representing numbers of lines of code changed in the reference files by a historic set of code.

18. The non-transitory computer-readable storage medium as described in claim 16, wherein the input data describes a number of historic sets of code jointly reviewed by the one or more candidate reviewers, respectively, and an author of the set of code.

19. The non-transitory computer-readable storage medium as described in claim 16, wherein the input data describes at least one of a number of historic sets of code authored by the one or more candidate reviewers.

20. The non-transitory computer-readable storage medium as described in claim 16, wherein the input data describes a number of historic sets of code reviewed, respectively, by the one or more candidate reviewers.

* * * * *